May 7, 1968

THOMAS K. TSAO ETAL 3,382,480

METHOD OF DETECTING TRAFFIC

Filed July 6, 1966

INVENTORS
THOMAS K. TSAO
SIMON YIN
MICHAEL YU

BY Semmes & Semmes

ATTORNEYS

May 7, 1968     THOMAS K. TSAO ETAL     3,382,480
METHOD OF DETECTING TRAFFIC

Filed July 6, 1966     6 Sheets-Sheet 6

TRAFFIC DETECTOR CONTROL UNIT

INVENTORS
THOMAS K. TSAO
SIMON YIN
MICHAEL YU
BY Semmes & Semmes
ATTORNEYS

United States Patent Office 3,382,480
Patented May 7, 1968

3,382,480
METHOD OF DETECTING TRAFFIC
Thomas K. Tsao, 4306 Sarasota Place, and Michael Yu, 4307 Yates Road, both of Beltsville, Md. 20705, and Simon Yin, 1 Comfort New Village, Shen-tain, Taipei, Taiwan, China
Filed July 6, 1966, Ser. No. 563,161
1 Claim. (Cl. 340—1)

ABSTRACT OF THE DISCLOSURE

A method of detecting objects by means of an ultrasonic echo system. The transmitter operates at a repetition rate of ten cycles per second and the receiver is gated so as to be responsive only during a desired receiving interval. Stationary objects are indicated by integrating successively occurring echoes and operating a relay when the integrator output reaches a predetermined level, while singly occurring echoes representative of a moving object are used to operate another relay.

---

The present invention is directed to a method of traffic detection, particularly a method in which ultra sound is utilized to detect both moving and stationary vehicular traffic within a desired detection zone.

Numerous previous inventors have tackled the problem of counting highway traffic. Conventionally, pneumatic hose or electric eye detecting mechanisms may be employed. The pneumatic hose is difficult to install, impermanent, and dangerous for pedestrians. The electric eye is complicated, expensive and generally ineffectual. Neither technique effectively discriminates between stationary and moving vehicles.

Applicants are able to detect and discriminate between both moving and stationary traffic by utilizing ultra sound. The method consists basically of generating a transmitter electrical pulse, transducing the electrical pulse to ultra sound, directing the ultra sound into a detection zone containing traffic, for example across a four lane highway; receiving the ultra sound reflected from an individual vehicle as an echo signal; transducing the echo signal to receiver output electronic pulse and counting the receiver output electrical pulse as a single vehicle detected. The detection zone may be shortened or lengthened, as desired. For example, the detection zone can be limited to a single lane of a multi-laned highway or may be extended to include four or more lanes. The application of the present method is not limited to vehicle detection but may be used militarily to detect enemy troops moving within a detection zone, or to detonate an aerial bomb as it approaches the target.

Accordingly, it is an object of invention to provide a reliable and convenient method for detecting vehicle traffic within a desired detection zone.

Another object of invention is to provide a method for using ultra sound in the detection of vehicular traffic.

Another object is to provide a method for selectively varying the size of the detection zone while using ultra sound in traffic detection.

Another object of invention is to provide a method of detecting vehicular traffic wherein stationary vehicles can be discriminated from moving vehicles.

Yet, additional objects of invention will become apparent from the ensuing specification and attached drawings wherein.

Figure 1:
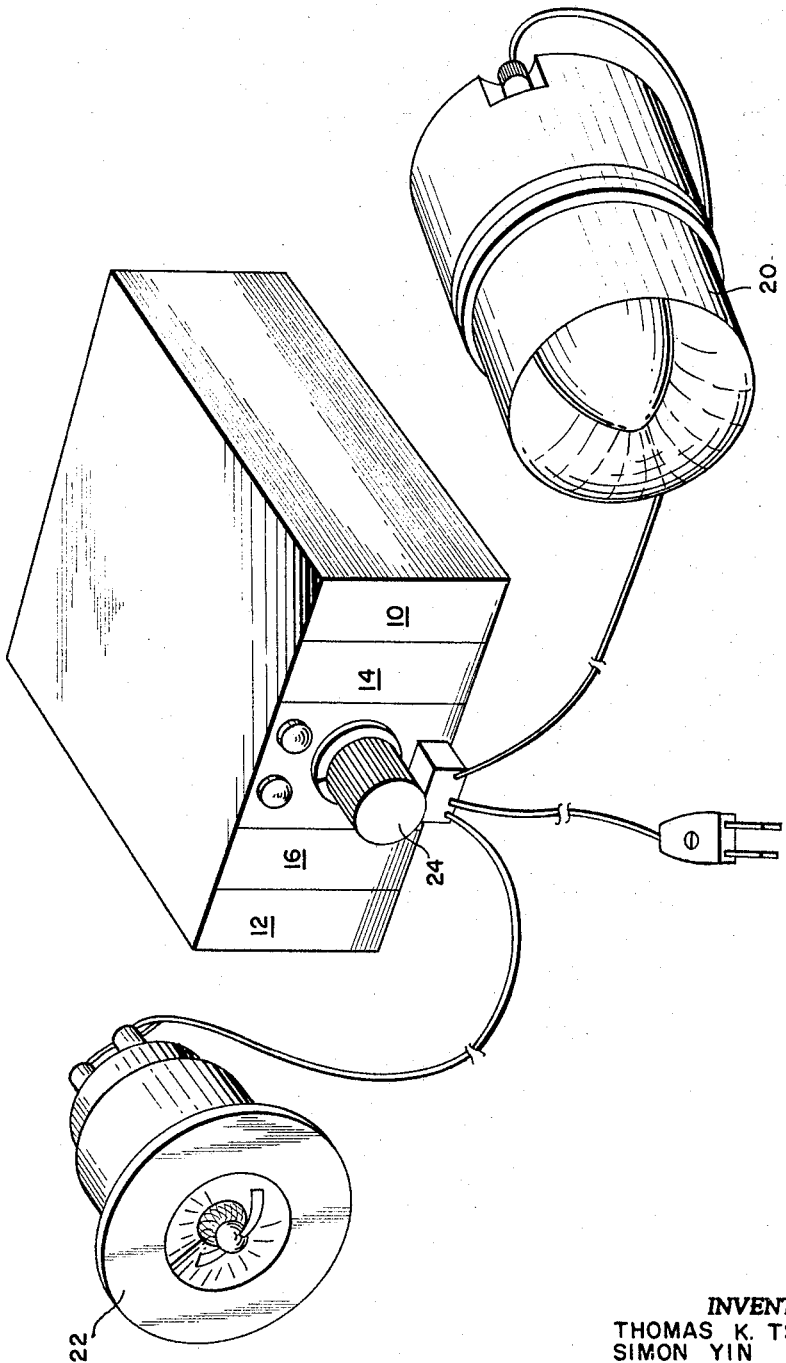
FIG. 1 is a perspective view of a proposed device, showing the transmitter transducer and receiver transducer elements positioned adjacent the compact unit.
Figure 2:
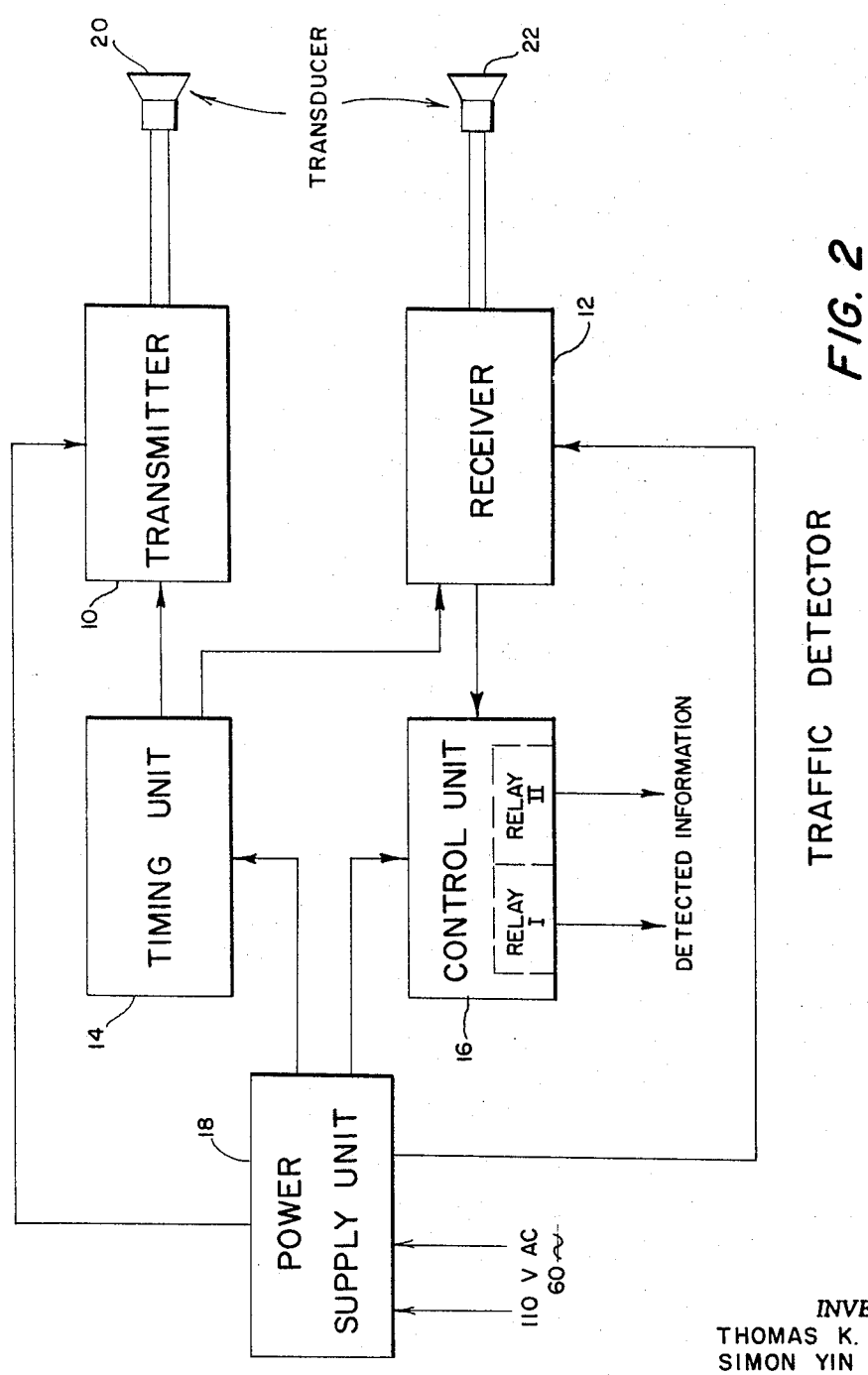
FIG. 2 is a schematic view of a unit illustrated in FIG. 1.
Figure 3:
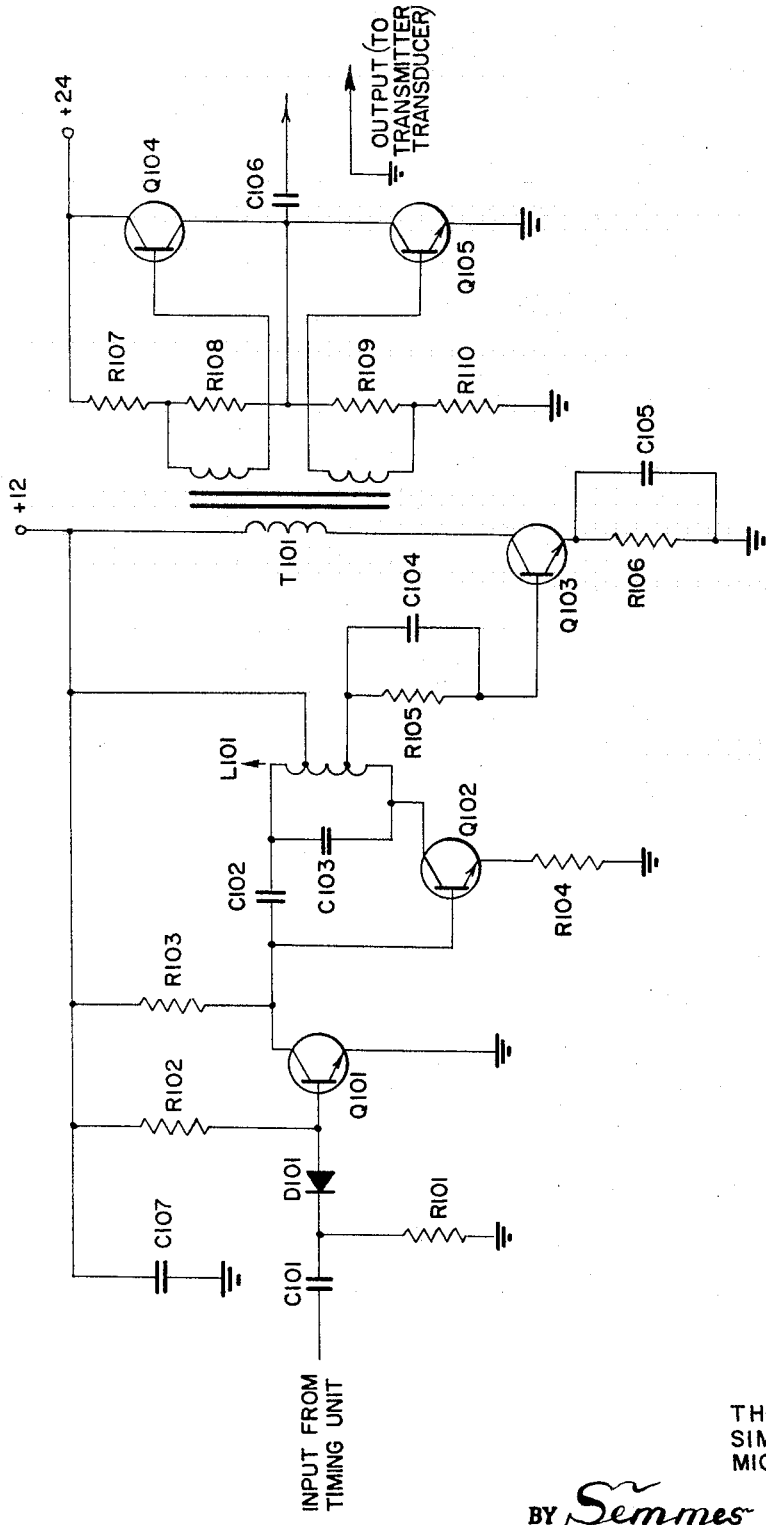
FIG. 3 is a circuit diagram of a transmitter, utilizable according to the present method.

In FIG. 1 there is illustrated a suggested unit for detection of vehicular traffic, according to the present method, and comprising transmitter 10, operatively connected to ultra sound transducer 20 and receiver 12 operatively connected to receiver ultra sound transducer 22. Timing unit 14 includes gating control knob 24 adjacent control unit 16. Gating control knob 24 is rotatable for setting at the desired detection zone limit, for example, 10, 15, 20, 25, 30, 35 or 40 feet from the unit. Normally, a ten foot detection zone will encompass a single highway lane, while a forty foot zone will encompass a four lane highway. Transmitter 10 generates a strong electrical pulse signal for the purpose of transmitting ultra sound via transducer 20. Transmitter 10 consists of five transistors, as illustrated in FIG. 3, with symbols Q-101 through Q-105. The master oscillator of the transmitter Q-102 employs a Hartley oscillator circuit which in turn is controlled by Q-101. Normally Q-101 supplies a cut-off bias to Q-102 in order to stop Q-102 operation. Therefore, Q-102 operates only when Q-101 is inactive. To achieve such purpose a pulse is sent in from timing unit 14. The pulse signal applied to Q-101 base will inactivate Q-101 and remove the cut-off bias to Q-102. Q-103 is a driver, the purpose of which is to enlarge the signal generated by Q-102 for the final amplifier Q-104 and Q-105. Q-104 and Q-105 comprise a specially designed pulsating signal power amplifier with a wide impedance matching capability. Q-104 and Q-105 output is coupled to transmitter transducer 20 to transmit pulsating sonic energy for the detection of an object present in the target area or detection zone.

Timing unit 14 consists of a timing and gate generator and a distributing network for the purpose of generating a precision timing signal and distributing through the network to achieve the exact timing for transmitting a pulsating signal and simultaneously controlling the receiver unit to receive the echo signal when an object is present in the detection zone.

Figure 5:
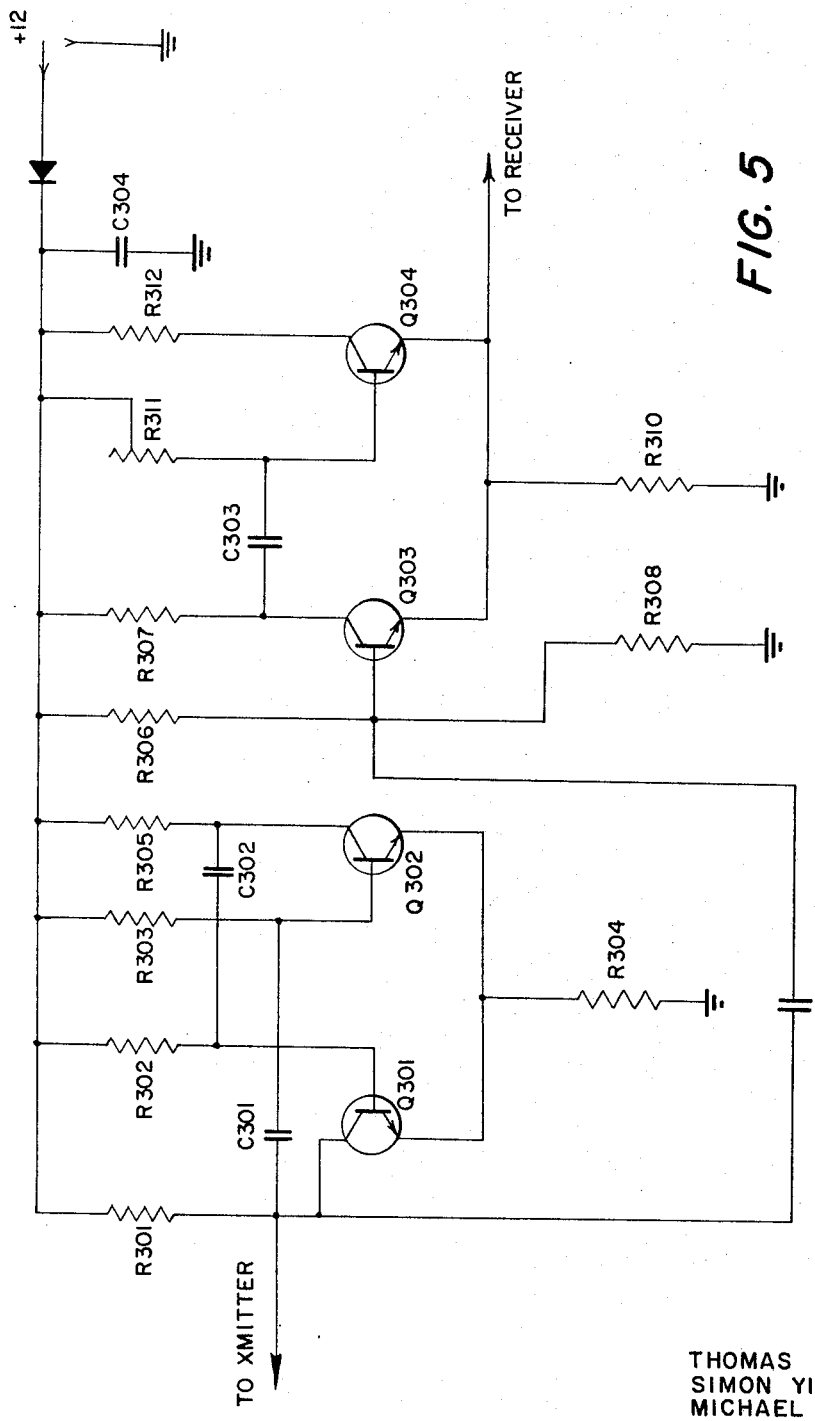
FIG. 5 is a circuit diagram of a proposed timing unit.

A timing generator is used to produce a pulsating wave in order to trigger the transmitter 10 and gate generator Q-303 and Q-304. Its repetition rate is around 10 c.p.s. and the pulse width is approximately 1/10 of a complete cycle. The pulse is generated by a multivibrator Q-301 and Q-302 as shown in FIG. 5. The frequency of the multivibrator is determined by the illustrated resistor/capacitor combination which produces a frequency of approximately 10 c.p.s. The front edge of the pulsating wave is used to trigger the gate generator which is composed of two transistors, Q-303, and Q-304 in order to produce a gating signal. The timing length of the gate generator can be varied by changing variable resistor R-311. As a result the range of the target area can instantly be varied. For example, by lengthening the time of the gating signal the physical area in which object can be detected is widened. Correspondingly, the detection zone can be narrowed, for example, from four highway lanes to one, by shortening the gating signal period. The gating signal is fed into the receiver 12 on-off network Q-203 and Q-204 in order to start and stop the output signal from the receiver.

Figure 4:
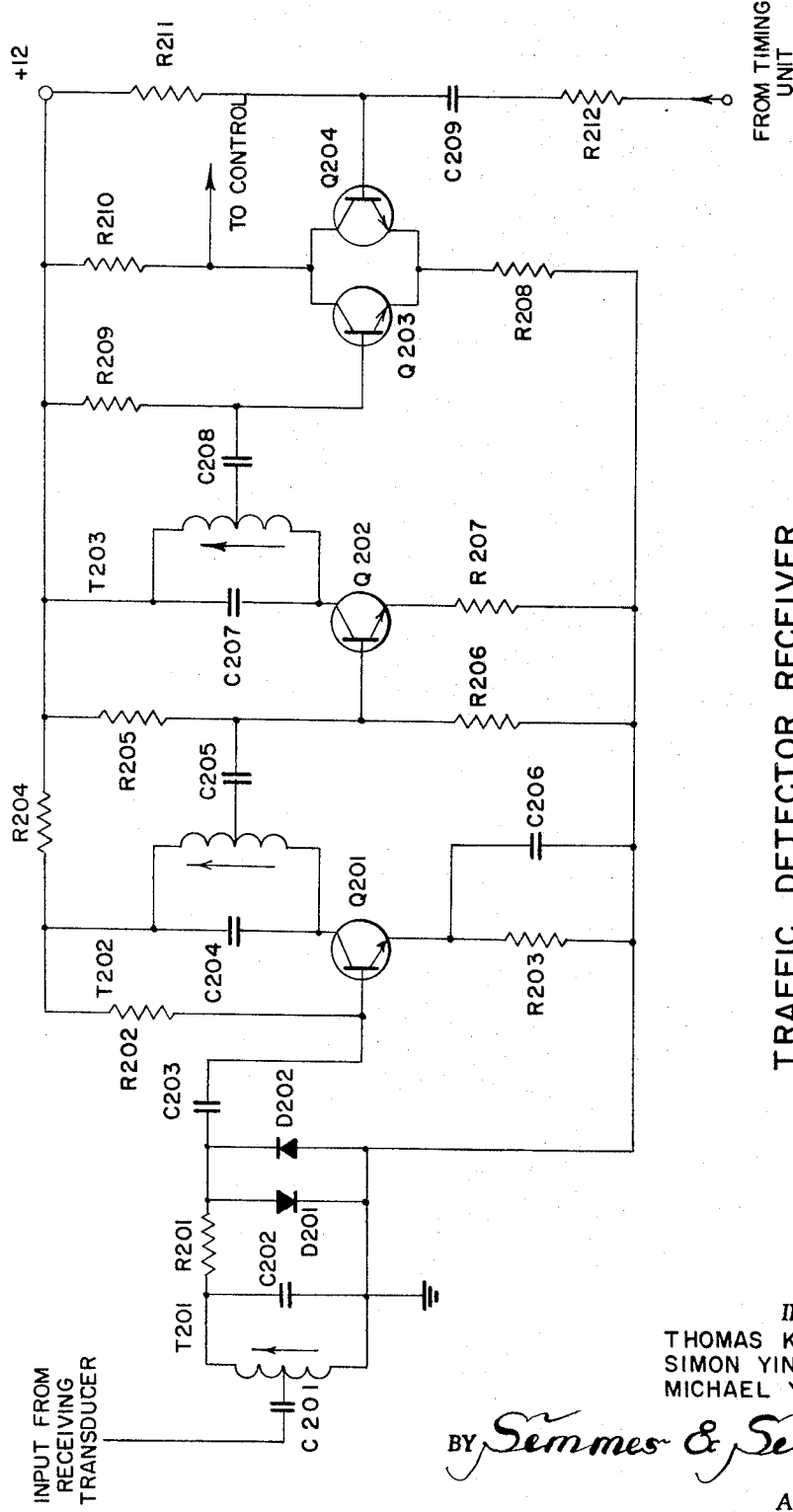
FIG. 4 is a circuit diagram of a proposed receiver.

The purpose of the receiver 12 is to pick up the echo signal by means of transducer 22 when such signal is reflected by an object either stationary or moving within the predetermined range of the detection zone. Receiver 12 is shown in FIG. 4 as consisting of a two-stage high-gain amplifier, Q-201 and Q-202. The echo-signal received by receiving transducer 22 is fed into a limiting network which will prevent amplifier Q-201 overload with a strong signal. Q-202 is a second stage high-gain amplifier, having its gain stabilized by negative feedback network. Q-202 output signal is sent into the on-off network consisting of Q-203 and Q-204. When a signal received by receiver 12 is fed into this network it will not produce any output signal unless the gating signal simultaneously arrives at this network. The output of this on-off network Q-203 and Q-204 is used to control echo processing circuit and is further analyzed by the control unit.

Figure 6:
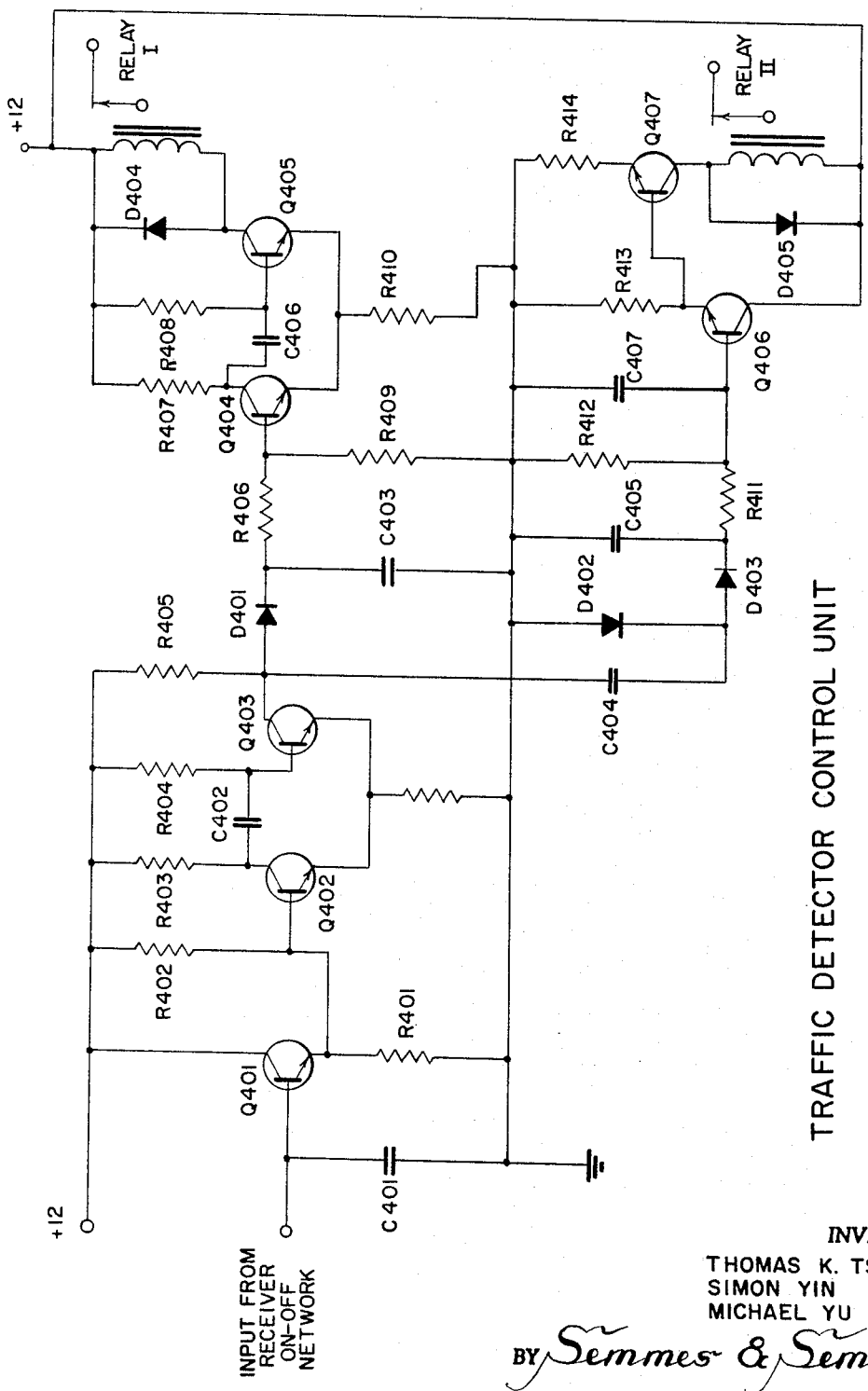
FIG. 6 is a circuit diagram of a proposed control unit.

The output signal sent in from the receiver on-off network Q-203 and Q-204 will trigger contact unit 16 multivibrator Q-402 and Q-403 as illustrated in FIG. 6. Since the multivibrator is activated only by the on-off network through Q-401, its output will feed through a network of amplifiers causing Q-405 to conduct and energize relay I to effect counting of a single moving vehicle. But, when this multivibrator Q-402 and Q-403 is triggered by the on-off network because due to a continuous pulsating echo signal being reflected by a stationary object or vehicle, it will continuously bring this information to the network of amplifiers. As illustrated in FIG. 6, further circuitry is added to this for reporting such information with a stairstep network. When a continuous pulsating signal is received, such as echoed from the above described stationary object, the output of the multivibrator Q-402 and Q-403 is fed to the stairstep network which produces a stairstep waveform until a predetermined voltage is reached, then Q-406 will conduct and relay II will be energized to effect counting of a stationary object in the information center. Manifestly, according to this method, both moving and stationary objects in the detection zone can be counted simultaneously. Power supply unit 18 utilizes local AC/DC power to produce the desired power for the different circuits, as indicated.

Transducer 20 (not illustrated in detail) is a conventional electro-mechanical device used to translate electrical energy generated in transmitter 10 to an ultra high sound pulsing wave. Transducer 22 is a similar, conventional electro-mechanical device utilized to pick up the ultra sound echo reflected from the object detected and to translate this echo to electrical energy for receiver 12, in order that the electrical pulse may be relayed to the control center for the purpose of counting.

Utilization of ultra sound suits the device for short range detecting purposes without being irritating to humans or affected by the weather. Since the method is discriminating as to both a moving object or stationary object regardless of size, the device can report a stopped or stalled vehicle to a traffic control center for indicating traffic jams or malfunction of the traffic flow. Miscounting is avoided by the use of two sets of information, viz, the self-generated gating signal and the echo signal. When both of these sets of information are present in receiver 12, a single output may be counted.

If both sets of information are not present, there is no output and miscounting is avoided. Since a multivibrator and a stair stepping network function together simultaneously, as illustrated in FIG. 6, both a stationary object reflecting a continuous pulsating signal, and a moving object reflecting a single pulse, may be utilized to count simultaneously both stationary and moving traffic. Inasmuch as the suggested devices are not dependent upon receiver sensitivity or strength of transmitter signals, there is an enhanced accuracy in counting, the detected information being received only once. The utilization of a resistance to control the period of gating provides a reliable method for varying the size of the detection zone without use of mechanical parts.

Manifestly, the suggested circuitry may be varied at will without departing from the spirit and scope of invention, as defined in the subjoined claim.

We claim:
1. Method of detecting a vehicle comprising:
 (A) generating a transmitter electrical pulse around 10 cycles per second, said pulse having a width approximately one-tenth of a complete cycle;
 (B) transducing said electrical pulse to ultra sound;
 (C) directing said ultra sound into a detection zone containing said vehicle;
 (D) receiving said ultra sound reflected from said vehicle as an echo signal;
 (E) transducing said echo signal to an output electrical pulse;
 (F) gating generating of said transmitter electrical pulse and receiving of said echo signal, so as to limit counting of output to gating periods only;
 (G) counting single echo signals as individual moving vehicles detected, while simultaneously
 (H) counting a continuously received echo signal as a stationary vehicle detected.

References Cited

UNITED STATES PATENTS

| 3,042,899 | 7/1962 | Kendall et al. | 340—38 |
| 3,114,128 | 12/1963 | Ljungman | 340—51 |
| 3,214,729 | 10/1965 | Frielinghas | 340—38 |
| 3,255,434 | 6/1966 | Schwarz | 340—38 |
| 3,283,292 | 11/1966 | Kay | 340—1 |
| 3,290,490 | 12/1966 | Auer | 235—150.24 |

RICHARD A. FARLEY, *Primary Examiner.*